United States Patent Office

3,065,066
Patented Nov. 20, 1962

3,065,066
METHOD OF DEFOLIATING PLANTS EMPLOYING AMINES
Dougal Harold McRae, Hatboro, Pa., and Elvin L. Wampler, Garden Grove, Calif., assignors to Rohm & Haas Company, Philadelphia, Pa., a corporation of Delaware
No Drawing. Filed Oct. 3, 1958, Ser. No. 766,172
15 Claims. (Cl. 71—2.3)

This invention relates to defoliation of plants, particularly plants bearing crops above ground such as cotton plants, for the purpose of aiding harvesting.

It has been a known practice for a number of years to apply agents to a large variety of plants for the purpose of removing leaves and thereby facilitating harvesting of the desired portions of the plants, particularly when mechanical harvesting means are employed. Certain known agents after specialized cells which develop an abscission layer at the base of the petiole. The result is that the plant defoliates. Most of the known agents have one or more inherent disadvantages, i.e., some of the agents adversely affect the desired crop, others do not bring about the desired result within a short enough period of time and as a result over-maturity may occur, other agents do not possess a sufficient defoliating effect, still other agents are affected by changes in the weather and as a result repeated and costly applications are necessary, and still other agents, although functioning properly insofar as defoliation is concerned, have corrosive effects towards the mechanical harvesting equipment.

The present invention is based on the discovery that a certain class of agents to be described more fully hereinafter, are efficient defoliants, particularly for the defoliation of cotton plants. The defoliants of the present invention bring about defoliation in a short time without adversely affecting the desired crop and are practically unaffected by changes in the weather.

The active defoliants in accordance with the present invention are monoamines containing only carbon, hydrogen and nitrogen and having at least one substituent which contains at least 6 and up to 28 carbon atoms, there being a total of at least 10 carbon atoms in the monoamine, each carbon atom containing subsituent of said monoamine being selected from the group consisting of alkyl, benzyl and alkyl substituted benzyl. These monoamines per se or in admixture with suitable diluents are used for contact application at preferred concentrations and rates of application as described more fully hereinafter.

A particularly effective class of amines within the scope of the above definition is a primary amine of the formula:

$$RNH_2$$

wherein R is alkyl containing a total of from 10 to 28 carbon atoms and having from 6 to 18 carbon atoms in a straight chain. Particularly effective primary amines of this formula include those wherein the carbon atoms other than those in the straight chain form lower alkyl substituents, i.e., alkyl substituents containing from 1 to 4 carbon atoms, particularly methyl or ethyl, and preferably two methyl substituents. Within this definition, a preferred class of amines includes those wherein the nitrogen linking carbon atom bears two such lower alkyl substituents, preferably two methyl substituents. A particularly preferred class of such amines comprises those wherein the nitrogen linking carbon atom alternate carbon atoms thereafter in the straight chain bear lower alkyl substituents, preferably methyl substituents.

The following are cited as examples of the amines of the formula $RNH_2$:

n-Decylamine
n-Dodecylamine
n-Pentadecylamine
n-Octadecylamine
1,1-diethylhexylamine
1,1,3,3,5,5-hexamethylhexylamine
1,1,3,3-tetramethylhexylamine
1,1-dimethyloctylamine
1,1,3,3,5,5,7,7,9,9-decamethyldecylamine
1,1,3,3,5,5-hexaethylhexylamine
1,1,3,3,5,5,7,7,9,9,11,11-dodecamethyldodecylamine The preparation of amines of the formula $RNH_2$ is well understood by those skilled in the art. Thus, these may be prepared by reduction of the corresponding alkyl nitrile, the nitrile being obtained by interaction of the corresponding halide with alkali metal cyanide, a convenient source for the halide being the corresponding alcohol. High molecular weight amines of this type are also commercially available from the Armour Company, Chicago, Illinois, under the trade name "Armeen."

It is well known that tertiary-alkyl primary amines may be prepared by the method of Ritter (Jour. Amer. Chem. Soc., 70, 4048 (1948)). Furthermore, as is well known, alkyl halides may be reacted with ammonia, although in this case the reaction mixture contains primary, secondary and tertiary amines. This reaction mixture may be used as obtained or it may be resolved into its individual components.

A further and important class of amines suitable for the purposes of the present invention are those of the formula:

$$R_1R_2NH$$

wherein $R_1$ is alkyl containing a total of from 8 to 28 carbon atoms and having from 6 to 18 carbon atoms in a straight chain and $R_2$ is a substituent selected from the group consisting of lower alkyl, benzyl and alkyl substituted benzyl containing up to 28 carbon atoms, $R_1$ and $R_2$ together containing at least 10 carbon atoms. A preferred class of amines of this formula includes those wherein the nitrogen linking carbon atom of $R_1$ and alternate carbon atoms thereafter in the straight chain bear lower alkyl substituents, i.e., alkyl substituents containing from 1 to 4 carbon atoms, particularly methyl and ethyl, and preferably methyl substituents.

The following are cited as examples of amines of the formula $R_1R_2NH$:

n-Octylethylamine
n-Octylbutylamine
n-Nonylmethylamine
n-Dodecylethylamine
n-Pentadecylethylamine
n-Octadecylmethylamine
n-Octylbenzylamine
n-Dodecylbenzylamine
n-Pentadecylbenzylamine
n-Octadecylbenzylamine
n-Octyl-2-methylbenzylamine
n-Decyl-3,5-dimethylbenzylamine
n-Dodecyl-4-propylbenzylamine
n-Octyl-2,4,6-tributylbenzylamine
n-Decyl-4-(1,1,3,3,5,5,7,7-octamethyloctyl)benzylamine
n-Octadecyl-3-(1,1,3,3,5,5,7,7,9,9-decamethyldecyl) benzylamine
n-Octyl-2-(1,1-dimethylhexyl)benzylamine
1,1-dimethylhexylethylamine 1,1,3,3,5,5-hexamethylhexylmethylamine
1,1,3,3,5,5,7,7,9,9-decamethyldecyl-n-butylamine
1,1,3,3,5,5-hexamethylhexylbutylamine
1,1-dimethylhexylbenzylamine
1,1-dimethylhexadecylbenzylamine
1,1,3,3,5,5-hexamethylhexylbenzylamine
1,1,3,3,5,5,7,7,9,9-decamethyldecylmethylamine
1,1,3,3,5,5,7,7,9,9-decamethyldecylbenzylamine
1,1,3,3,5,5,7,7,9,9,11,11-dodecamethyldodecyl-benzylamine
1,1,3,3,5,5,7,7-octaethyloctylbenzylamine
1,1,3,3,5,5,7,7,9,9-decamethyloctadecylbenzylamine
1,1-dimethylhexyl-2-methylbenzylamine
1,1,3,3,5,5-hexamethylhexyl-3-methylbenzylamine
1,1,3,3,5,5,7,7-octaethyloctyl-4-methylbenzylamine
1,1,3,3,5,5,7,7,9,9-decamethyldodecyl-2-methyl-benzylamine
1,1,3,3,5,5-hexamethylhexyl-2-butylbenzylamine
1,1-dimethylhexyl-3,5-dimethylbenzylamine
1,1,3,3,5,5-hexamethylhexyl-2-(1,1-dimethylhexyl) benzylamine
1,1-diethyloctyl-2-n-butylbenzylamine
1,1,3,3-tetramethylhexyl-2,6-(di-1,1,3,3-tetramethylhexyl) benzylamine
1,1,3,3,5,5,7,7,9,9-decamethyldecyl-4-(1,1,3,3-tetramethylbutyl) benzylamine
1,1,3,3,5,5,7,7,9,9,11,11-dodecamethyldodecyl-4-(1,1,3,3,5,5,7,7,9,9-decamethyldecyl) benzylamine The preparation of amines of the formula $R_1R_2NH$ as defined above is well known to those skilled in the art. Thus, for example, an N-alkyl-N-benzylamine may be prepared by reacting a primary amine having the desired alkyl substituent with a benzyl halide or an alkyl-benzyl halide as is known. Those amines having both a higher molecular weight alkyl substituent and a lower alkyl substituent may also be prepared by a completely analogous method. Commercial products made by these methods tend to be mixtures of amines and these mixtures may be used for the purposes of the present invention.

A further and important class of amines in accordance with the present invention includes amines of the formula:

$$R_3R_4NH$$

wherein $R_3$ and $R_4$ are each alkyl, one of them containing from 6 to 28 carbon atoms and the other containing from 4 to 28 carbon atoms. A preferred class of amines within this definition includes those wherein $R_3$ and $R_4$ are each n-alkyl and contain from 6 to 10 carbon atoms. Another and preferred class are those wherein $R_3$ is n-alkyl containing from 6 to 18 carbon atoms and $R_4$ is t-alkyl containing from 4 to 28 carbon atoms. A "t-alkyl" substituent is understood by those skilled in the art to include a nitrogen linking carbon atom having substituents as follows:

As in the case of other amines in accordance with the present invention, preferred t-alkyl substituents include those wherein the nitrogen linking carbon atoms has two lower alkyl substituents, i.e., substituents containing from 1 to 4 carbon atoms, preferably two methyl substituents. A particularly suitable t-alkyl substituent ($R_4$) is one wherein the nitrogen linking carbon atom and alternate carbon atoms thereafter have two lower alkyl substituents, particularly methyl or ethyl, and preferably methyl substituents.

The following are cited as examples of amines of the formula $R_3R_4NH$:

Di-n-hexylamine
Di-n-octylamine
Di-n-nonylamine
Di-n-dodecylamine
Di-n-pentadecylamine
Di-n-pentacosylamine
n-Hexyl-n-butylamine
n-Dodecyl-n-butylamine
n-Hexyl-n-decylamine
n-Dodecyl-n-pentadecylamine
n-Octyl-n-decylamine
n-Eicosyl-isobutylamine
n-Hexyl-1,1-dimethylethylamine
n-Octyl-1,1,3,3-tetramethylpropylamine
n-Decyl-1,1,3,3-tetramethylbutylamine
n-Hexyl-1,1,3,3,5,5-hexamethylhexylamine
n-Pentadecyl-1,1,3,3-tetramethylbutylamine
n-Dodecyl-1,1,3,3,5,5,7,7,9,9,11,11-dodecamethyl-dodecylamine
n-Octadecyl-1,1,3,3-tetraethylpentylamine The preparation of amines of the formula $R_3R_4NH$ is also well understood by those skilled in the art. Thus, di-n-alkylamines are conveniently prepared by reacting a primary amine containing a desired alkyl substituent with an alkyl iodide to form an intermediate dialkyl ammonium iodide. The latter compound reacts with ammonia to form the desired secondary amine as well as lesser amounts of the tertiary amine. Heating the reaction mixture which also contains salts of these amines with an excess of strong base liberates the amines. The mixture of amines may be separated by distillation. The n-alkyl-t-alkyl amines may be prepared in a completely analogous fashion by reacting an n-alkyl bromide with a primary t-alkyl amine, converting the salts in the resulting mixture of the free amine by reaction with a strong base, separating the organic portion, and recovering the desired amine by distillation.

Another and valuable class of amines in accordance with the present invention are those of the formula:

$$R_5R_6R_7N$$

wherein each of $R_5$, $R_6$, and $R_7$ are alkyl containing up to 28 carbon atoms, there being a total of at least 10 and up to 37 carbon atoms in said substituents. A preferred class of amines within this definition includes those wherein $R_5$ is n-alkyl containing from 10 to 18 carbon atoms and $R_6$ and $R_7$ are lower alkyl, i.e., alkyl containing from 1 to 4 carbon atoms. Another preferred class of amines within the above formula are those wherein $R_5$ and $R_6$ are each n-alkyl containing from 6 to 12 carbon atoms and $R_7$ is lower alkyl, i.e., alkyl containing from 1 to 4 carbon atoms.

The following are cited as examples of amines of the formula $R_5R_6R_7N$:

Tri-n-butylamine
Tri-n-octylamine
Tri-n-dodecylamine
Di-n-butylethylamine
Di-n-butylisopropylamine
Di-n-hexyl-methylamine
Di-n-octyl-methylamine
Di-n-decylmethylamine
Di-n-dodecylmethylamine
Di-n-hexylethylamine
Di-n-hexyl-n-butylamine
Di-n-dodecyl-n-butylamine
Dimethyl-n-decylamine
Dimethyl-n-dodecylamine
Dimethyl-n-pentadecylamine
Dimethyl-n-hexadecylamine
Dimethyl-n-octadecylamine
Diethyl-n-dodecylamine
Di-n-butyl-n-pentadecylamine
Dimethyl-1,1,3,3,5,5,7,7,9,9-decamethyldecylamine The preparation of the tertiary amines of the formula $R_5R_6R_7N$ is also well known to those skilled in the art and has been disclosed above in connection with the tertiary amines obtained in connection with the formula $R_3R_4NH$.

Another valuable class of amines in accordance with the present invention are tertiary amines of the formula:

$$R_8R_9R_{10}N$$

wherein $R_8$ and $R_9$ are each alkyl substituents containing up to 8 carbon atoms and $R_{10}$ is a substituent selected from the group consisting of benzyl and alkyl substituted benzyl, the total number of carbon atoms in said substituents being from about 10 to 37.

The following are cited as examples of the formula $R_8R_9R_{10}N$:

Diethylbenzylamine
Di-n-butylbenzylamine
Di-n-hexylbenzylamine
Di-n-octylbenzylamine
Methylethylbenzylamine
Methylbutylbenzylamine
Methyloctylbenzylamine
Dimethyl-2-methylbenzylamine
Di-n-butyl-4-n-propylbenzylamine
Dimethyl-3,5-dimethylbenzylamine
Di-n-octyl-2,6-diethylbenzylamine
Di-n-hexyl-2,4,6-triethylbenzylamine
Di-n-pentyl-2,4,6-triisobutylbenzylamine
Diethyl-2,4,6-triethylbenzylamine
Dimethyl-4-(1,1,3,3,5,5-hexamethylhexyl)benzylamine
Dimethyl-(2-methyl-6-[1,1,3,3,5,5-hexamethylhexyl])-benzylamine
Di-n-octyl-4-(1,1,3,3,5,5-hexamethylhexyl)benzylamine
Di-n-pentyl-4-(1,1,3,3,5,5,7,7,9,9-decamethyldecyl)-benzylamine The preparation of amines of the formula $R_8R_9R_{10}N$ is completely analogous to the preparation of amines of the formula $R_1R_2NH$ wherein $R_2$ is benzyl or alkyl substituted benzyl except that a secondary amine containing the desired substitutes for $R_8$ and $R_9$ is employed in place of the $R_1NH_2$ primary amine containing the desired $R_1$ alkyl substituent.

As indicated above, the active amine defoliant per se of the present invention may be used for contact application. However, the preferred method of application involves contacting the leaves of the plants with a spray or dust formulation. The preferred amount of active agent included in such a formulation will depend upon a number of factors including the activity of the selected amine, the specific method of application, climatic conditions, the density of cotton planting, the rate of application, etc. In general, it may be stated that from about 1 to 20 pounds of the active amine should be evenly distributed over an acre of cotton planted in the usual fashion, e.g., rows of cotton spaced two or three feet apart with individual plant spacings in a row of about one foot.

The preferred spray formulations of the present invention include an aqueous or other suitable liquid carrier containing from about 0.5 to 60% by weight of the active amine. In terms of treating an acre of regularly planted cotton, the application rate is from about 2 to 100 gallons of spray formulation containing from about 0.5 to 60% by weight of the active amine.

When a spray formulation is applied from the air by conventional airplane spray apparatus, a preferred treatment rate per acre of regularly planted cotton includes from about 2 to 20 gallons of formulation containing from about 1.0 to 50% by weight of the active amine. A preferred air application rate within this range includes from about 5 to 10 gallons of spray formulation containing from about 5 to 30% by weight of active amine.

When applying the spray formulations of the present invention by conventional ground spray means, a preferred rate of application for treating of regularly planted cotton includes the use of from about 20 to 100 gallons of spray formulation containing from about 2 to 15% by weight of the active amine.

For the purpose of producing aqueous spray formulations in accordance with the present invention, it is desirable to employ an emulsifying or dispersing agent. As will be appreciated by those skilled in the art, the selection of the amine and the amount of such amine employed in terms of percent by weight of the spray formulation will determine the choice of emulsifying or dispersing agent. Examples of conventional emulsifying and dispersing agents include fatty alcohol sulfates such as sodium lauryl sulfate aliphatic or aromatic sulfonates such as sulfonated castor oil or the various alkaryl sulfonates, e.g., the sodium salt of monosulfonated nonyl naphthalene, and non-ionic types of agents such as the high molecular weight alkyl polyglycolethers or analogous thioethers such as the decyl, dodecyl, and tetradecyl polyglycolethers and thioethers containing from 25 to 75 carbon atoms. The long chain amines form a class compounds which are somewhat difficult to emulsify, but it has been found that they are satisfactorily emulsified by non-ionic emulsifiers such as an octylphenoxypolyethoxyethanol having 6 to 9 ethoxy units. In general, the amount of emulsifying agent employed based on the weight of the amine will vary from about 0.5% to 15% by weight, 1,1,3,3,5,5,7,7,9,9-decamethyldecylamine being emulsified with about 4 to 14% by weight of a non-ionic emulsifier such as octylphenoxypolyethoxyethanol having 6 to 9 ether groups.

Although spray formulations are preferred in accordance with the present invention, the active amines of the present invention which are normally liquids may be absorbed on a particulated solid material and employed as dusting formulations. Inert diluents such a fuller's earth, talc, bentonite, kieselguhr, diatomaceous earth, etc., are examples of suitable clays. Non-clay materials such as sulfur, volcanic ash, calcium carbonate and ground cellulosic materials such as wood flour, cotton seed, etc., are also satisfactory. For optimum results the solid carriers should be in finely divided form, e.g., they should be sufficiently fine to pass through a 100 or finer mesh sieve. The usual application rate when employing dusting formulations as described above is from about 1 to 20 pounds of active amine per acre of regularly planted cotton preferably 2 to 10 pounds. The choice of carrier and hence its ability to absorb the selected amine will determine the amount of diluent necessary, this selection being within the skill of the art.

Other substances than the carrier, either liquid or solid, may be included in the formulations of the present inventions, if desired, to bring about various physical improvements such as stability on storage, improvement in respect to coverage, adherence, etc. Additionally, it may be found advantageous to employ a mixture of the active amines of the present invention. For example, a crude mixture of amines produced in accordance with one of the processes described above is often preferred rather than the individual amine separated from the mixture by conventional means such as distillation. Additionally, it has been found that some of the less active amines in combination with the more active amines as tabulated hereinafter, produce amine mixtures which are as effective, and in some instances are more effective than either amine used separately.

As is known in the art of defoliation, most defoliating agents are applied about 2 or 3 weeks before the time at which it is desired to harvest cotton. Similarly, the amines of the present invention are applied at about the same time. The active amines of the present invention cause defoliation of from about 35 to 60% of the leaves which would not normally have been removed due to the weather conditions up to one week after application. Defoliation of up to 98% is obtained, i.e., 98% of the leaves which would not normally have been removed due to weather conditions, about two weeks after application.

The amines of the present invention are particularly effective as bottom leaf defoliants. Bottom leaf defoliation is desirable for the purpose of permitting picking of the cotton bolls on the bottom portions of the plants at the time of their maturity in order to avoid boll rotting by fungus and insect attack. In this connection, the amines of the present invention in admixture with conventional fungicidal and/or insecticidal agents are found to be particularly effective.

An important attribute of any cotton defoliating agent is the ability, not only to bring about efficient defoliation as explained above, but also to accomplish this result without injuring or causing loss of the desired cotton bolls. In this respect the amines of the present invention are particularly effective as compared with many of the accepted commercial defoliating agents. Thus, on comparing Primene JM at an application rate of about 3 pounds per acre of regularly planted cotton with a commercial formulation containing 58% $MgClO_3 \cdot 6H_2O$ as the active defoliant and applied at a rate of 10 pounds per acre, it was found that the former was not only superior as a defoliant but also caused more rapid opening of the bolls without damage (91% versus 81% open) than the latter. Additionally, non-defoliated leaves were more highly desiccated when employing Primene JM and were thus more easily removed by pressure such as applied by a mechanical cotton picker.

*Example I*

Leaves of mature field grown cotton plants were treated at application rates of 0.64 and 6.4 lbs. per acre at a carrier rate of approximately 200 gallons per acre. Treatments were made to 12 leaves on 3 plants for a total of 36 leaves per treatment. The number of leaves which had defoliated was determined 2 weeks following treatments. Data given below illustrate the defoliating activity of a number of amines of the present invention:

| Amine | Application Rate (Pounds/Acre) | Percent Defoliation After 2 Weeks |
| --- | --- | --- |
| n-dodecylamine | 0.64 / 6.4 | 31 / 83 |
| 1,1,3,3,5,5-hexamethylhexylamine | 0.64 / 6.4 | 54 / 93 |
| 1,1,3,3,5,5,7,7,9,9-decamethyldecylamine | 0.64 / 6.4 | 81 / 97 |
| n-octadecylmethylamine | 0.64 / 6.4 | 68 / 95 |
| 1,1,3,3,5,5-hexamethylhexylbenzylamine | 0.64 / 6.4 | 90 / 97 |
| 1,1,3,3,5,5,7,7,9,9 - decamethyl - decylmethylamine | 0.64 / 6.4 | 48 / 99 |
| di-n-octylamine | 0.64 / 6.4 | 85 / 96 |
| n-octyl-1,1,3,3-tetramethylbutylamine | 0.64 / 6.4 | 48 / 87 |
| di-n-octylmethylamine | 0.64 / 6.4 | 97 / 96 |
| dimethyl-n-hexadecylamine | 0.64 / 6.4 | 97 / 98 |
| dimethyl - [12 - methyl - 6 - 1,1,3,3,5,5 - hexamethylhexyl)]benzylamine | 0.64 / 6.4 | 32 / 66 |
| Primene 81 [1] | 0.64 / 6.4 | 50 / 90 |
| Primene JM [1] | 0.64 / 6.4 | 93 / 97 |

[1] Commercially available mixtures of amines of the formula
$$C_nH_{2n+1}NH_2$$
wherein $C_nH_{2n+1}$ represents tert-alkyl groups of 12 to 15 carbon atoms for Primene 81 and 18 to 24 carbon atoms for Primene JM.

*Example II*

The following are illustrative of suitable formulations for the purpose of air spray application for cotton defoliation:

(a) The amines described herein may be formulated as emulsion concentrates with any suitable organic solvent. For example, an emulsion concentrate of Primene JM may be prepared as follows:

|  | Pounds |
| --- | --- |
| Primene JM (defined above) | 4.0 |
| Xylene | 3.6 |
| Octylphenoxypolyethoxyethanol having 6 to 9 ethoxy units | 0.4 |

For air spray application, 2 gallons of the above formulation may be added to 3 gallons of water and the total, i.e., 5 gallons, applied to one acre of regularly planted cotton, as defined above.

|  | Pounds |
| --- | --- |
| (b) Primene 81 (defined above) | 4.0 |
| Kerosene | 3.5 |
| Calcium dodecylbenzenesulfonate | 0.045 |
| Octylphenoxypolyethoxyethanol averaging 10 ether groups | 0.38 |
| Methanol | 0.05 |
| Aromatic naphtha | 0.025 |

Three gallons of the above emulsion concentrate is added to 2 gallons of water and applied to one acre of regularly planted cotton as defined above.

(c) Since most of the amines described herein are liquids, a preferred method of formulation excludes the use of organic solvents and makes use of the fact that an emulsifier may be found which will emulsify and uniformly disperse the amine in water. The choice of emulsifier will depend upon the particular amine and the object is to select an emulsifier which will give a stable emulsion when the amine is added to water.

A highly satisfactory emulsifier for Primene JM, for example, is an octylphenoxypolyethoxyethanol. The following is illustrative of a preferred formulation:

|  | Pounds |
| --- | --- |
| Primene JM (defined above) | 7.2 |
| Octylphenoxypolyethoxyethanol averaging 6 to 9 ethoxy units | 0.8 |

One gallon of the above formulation is added to 4 gallons of water and a spontaneous emulsion forms. The 5 gallons of Primene JM emulsion is then applied by air to one acre of regularly planted cotton as defined above.

*Example III*

Cotton may be defoliated by applying the active material with ground spray equipment. The primary difference between ground and air spray techniques is that for ground spray applications the active agent is normally dispersed in a larger carrier volume than that used for air spray applications. Consequently liquid formulations for both spray techniques are similar.

The following are illustrative of suitable formulations for ground spray application for treating one acre of regularly planted cotton as defined above:

|  | Pounds |
| --- | --- |
| (a) Di-n-octylmethylamine | 4.0 |
| Xylene | 3.5 |
| Octylphenoxypolyethoxyethanol averaging 10 ether units | 0.5 |

One and one-half gallons of the above emulsion concentrate is added to 50 gallons of water and the total is applied to one acre of regularly planted cotton.

|  | Pounds |
| --- | --- |
| (b) Di-n-octylamine | 5.0 |
| Kerosene | 2.6 |
| Methyl ether of octylphenoxypolyethoxyethanol having 16 ethoxy units | 0.4 |

One gallon of the above formulation added to 30 gallons of water is applied to one acre of regularly planted cotton.

(c) For ground spray applications as with air spray applications, a preferred formulation consists of the amine together with a satisfactory emulsifier. For example:

|  | Pounds |
| --- | --- |
| Primene JM | 7.6 |
| Octylphenoxypolyethoxyethanol having 6 to 9 ethoxy units | 0.4 |

One gallon of the above formulation added to 40 gallons of water is applied to one acre of regularly planted cotton.

Example IV

The following are illustrative of suitable formulations for dusting application for treating one acre of regularly planted cotton as defined above:

(a)
| | Pounds |
|---|---|
| Primene JM | 5 |
| Synthetic calcium silicate | 5 |
| Hydrated aluminum magnesium silicate | 5 |
| Pyrophyllite | 5 |

Twenty pounds of formulation (a) is dusted on one acre of cotton.

(b)
| | Pounds |
|---|---|
| 1,1,3,3,5,5,7,7,9,9-decamethyldecylamine | 5 |
| Precipitated calcium silicate | 5 |
| Fuller's earth | 5 |
| Pyrophyllite | 5 |

Eighty pounds of formulation (b) is dusted on one acre of cotton.

(c)
| | Pounds |
|---|---|
| Dimethyl-n-hexadecylamine | 2 |
| Synthetic calcium silicate | 2 |
| Hydrated aluminum magnesium silicate | 8 |
| Pyrophyllite | 8 |

Twenty pounds of the formulation (c) is dusted on one acre of cotton.

(d)
| | Pounds |
|---|---|
| Primene 81 | 2 |
| Precipitated calcium silicate | 2 |
| Magnesium carbonate | 0.3 |
| Octylphenoxypolyethoxyethanol averaging 10 ethoxy units | 0.2 |
| Fuller's earth | 7.5 |
| Pyrophyllite | 8 |

Eighty pounds of formulation (d) is dusted on one acre of cotton.

(e)
| | Pounds |
|---|---|
| Di-n-octylmethylamine | 1 |
| Kaolin | 16 |
| Fuller's earth | 2.9 |
| Condensed naphthalene-formaldehyde sodium sulfonate | 0.1 |

Twenty pounds of formulation (e) is dusted on one acre of cotton.

In place of the amines formulated above, there may be used any of the other amines previously defined and these may be formulated in compositions comparable to those defined above.

This application is a continuation-in-part of application Serial No. 686,273 of September 26, 1957, now abandoned.

The foregoing description of the present invention including the examples is for the purpose of illustration only and not limiting to the scope thereof which is set forth in the claims.

What is claimed is:

1. The method of defoliating cotton plants which comprises applying to the leaves of said plants a defoliating amount of a composition containing as the essential active ingredient a monoamine containing only carbon, hydrogen and nitrogen and having at least one hydrocarbon substituent which contains at least 6 and up to 28 carbon atoms, there being a total of at least 10 carbon atoms in said amine, each hydrocarbon substituent of said monoamine being selected from the group consisting of alkyl, benzyl, and alkyl substituted benzyl.

2. The method of defoliating cotton plants which comprises applying to the leaves of said plants a defoliating amount of a composition containing as the essential active ingredient an amine of the formula:

$$RNH_2$$

wherein R is alkyl containing a total of from 10 to 28 carbon atoms and having from 6 to 18 carbon atoms in a straight chain.

3. The method of defoliating cotton plants as set forth in claim 2 wherein the nitrogen linking carbon atom has two methyl substituents.

4. The method of defoliating cotton plants which comprises applying to the leaves of said plants a defoliating amount of a composition containing as the essential active ingredient an amine of the formula:

$$RNH_2$$

wherein R is alkyl containing a total of from 10 to 28 carbon atoms and having from 6 to 18 carbon atoms in a straight chain, the remaining carbon atoms forming lower alkyl substituents.

5. The method of defoliating cotton plants which comprises applying to the leaves of said plants a defoliating amount of a composition containing as the essential active ingredient an amine of the formula:

$$RNH_2$$

wherein R is alkyl containing a total of from 10 to 28 carbon atoms and having from 6 to 18 carbon atoms in a straight chain, the nitrogen linking carbon atom and alternate carbon atoms thereafter in said straight chain each having two lower alkyl substituents.

6. The method of defoliating cotton plants which comprises applying to the leaves of said plants a defoliating amount of a composition containing as the essential active ingredient an amine of the formula:

$$R_1R_2NH$$

wherein $R_1$ is alkyl containing a total of from 8 to 28 carbon atoms and having from 6 to 18 carbon atoms in a straight chain, and $R_2$ is lower alkyl, $R_1$ and $R_2$ together containing at least 10 carbon atoms.

7. The method of defoliating cotton plants which comprises applying to the leaves of said plants a defoliating amount of a composition containing as the essential active ingredient an amine of the formula:

$$R_3R_4NH$$

wherein $R_3$ and $R_4$ are each alkyl, one of them containing from 6 to 28 carbon atoms and the other containing from 4 to 28 carbon atoms.

8. The method of defoliating cotton plants which comprises applying to the leaves of said plants a defoliating amount of a composition containing as the essential active ingredient an amine of the formula:

$$R_3R_4NH$$

wherein $R_3$ and $R_4$ are each n-alkyl containing from 6 to 10 carbon atoms.

9. The method of defoliating cotton plants which comprises applying to the leaves of said plants a defoliating amount of a composition containing as the essential active ingredient an amine of the formula:

$$R_3R_4NH$$

wherein $R_3$ is n-alkyl containing from 6 to 18 carbon atoms and $R_4$ is t-alkyl containing from 4 to 28 carbon atoms.

10. The method of defoliating cotton plants which comprises applying to the leaves of said plants a defoliating amount of a compostion containing as the essential active ingredient an amine of the formula:

$$R_5R_6R_7N$$

wherein each of $R_5$, $R_6$, and $R_7$ are alkyl containing up to 28 carbon atoms, said substituents together containing a total of at least 10 carbon atoms and up to 37 carbon atoms.

11. The method of defoliating cotton plants which comprises applying to the leaves of said plants a defoliating amount of a composition containing as the essential active ingredient an amine of the formula:

$$R_5R_6R_7N$$

wherein $R_5$ and $R_6$ are each n-alkyl containing from 6 to 12 carbon atoms and $R_7$ is lower alkyl.

12. The method of defoliating cotton plants which comprises applying to the leaves of said plants a defoliating amount of a composition containing as the essential active ingredient an amine of the formula:

$$R_8R_9R_{10}N$$

wherein $R_8$ and $R_9$ are each alkyl substitutents containing up to 8 carbon atoms and $R_{10}$ is an alkyl-substituted benzyl, said substitutents containing a total of from 10 to 37 carbon atoms.

13. The method of defoliating cotton plants which comprises applying to the leaves of said plants a defoliating amount of a composition containing as the essential active ingredient an amine of the formula:

$$R_1R_2NH$$

wherein $R_1$ is alkyl containing a total of from 8 to 28 carbon atoms and having from 6 to 18 carbon atoms in a straight chain, and $R_2$ is benzyl, $R_1$ and $R_2$ together containing at least 10 carbon atoms.

14. The method of defoliating cotton plants which comprises applying to the leaves of said plants a defoliating amount of a composition containing as the essential active ingredient an amine of the formula:

$$R_1R_2NH$$

wherein $R_1$ is alkyl containing a total of from 8 to 28 carbon atoms and having from 6 to 18 carbon atoms in a straight chain, and $R_2$ is an alkyl-substituted benzyl containing up to 28 carbon atoms, $R_1$ and $R_2$ together containing at least 10 carbon atoms.

15. The method of defoliating cotton plants which comprises applying to the leaves of said plants a defoliating amount of a composition containing as the essential active ingredient an amine of the formula:

$$\begin{array}{c} CH_3 \\ | \\ R'-C-NH_2 \\ | \\ CH_3 \end{array}$$

wherein R' is alkyl containing a total of from 7 to 25 carbon atoms and having from 5 to 17 carbon atoms in a straight chain, the remaining carbon atoms forming methyl substituents.

References Cited in the file of this patent

UNITED STATES PATENTS

| | | |
|---|---|---|
| 2,160,058 | Covert | May 30, 1939 |
| 2,730,440 | Fincke | Jan. 10, 1956 |
| 2,779,741 | Cross | Jan. 29, 1957 |

OTHER REFERENCES

"Plant Regulators," pages a, b, c, 1, 17, and 22, CBCC Positive Data Series, No. 2, June 1955, National Research Council, publication 384.

Ahlgren et al. in "Principles of Weed Control," page 268, John Wiley and Sons, Inc., N.Y., copyright 1951.

Ciamician et al. in "Chemical Abstracts," vol. 16, pages 1261 and 1262 (1922).

Chabrolin in "Comptes Rendus," vol. 216, Slane Or., Jan. 4, 1943, pages 79 to 81.